United States Patent [19]

Nakayama

[11] Patent Number: 5,453,684
[45] Date of Patent: Sep. 26, 1995

[54] POSITION DETECTING METHOD FOR USE IN OPTICAL SYSTEM OF A VIDEO CAMERA FOR CORRECTING GAIN AND OFFSET FOR PERIODIC WAVEFORMS

[75] Inventor: Akihito Nakayama, Tokyo, Japan

[73] Assignee: Sony Corporation, Tokyo, Japan

[21] Appl. No.: 117,714

[22] Filed: Sep. 8, 1993

[30] Foreign Application Priority Data

Sep. 18, 1992 [JP] Japan .................... 4-275240

[51] Int. Cl.$^6$ .............. G01D 5/18; G01B 7/14; G03B 13/18; G05D 3/00
[52] U.S. Cl. ............... 324/207.12; 318/632; 318/653; 324/207.21; 324/207.24; 354/400; 364/571.01
[58] Field of Search .................... 324/160, 163, 324/166, 173, 174, 207.12, 207.2, 207.21, 207.23, 207.24, 207.25; 318/632–634, 653; 364/560, 561, 565, 571.01; 354/400

[56] References Cited

U.S. PATENT DOCUMENTS

| | | | |
|---|---|---|---|
| 4,283,679 | 8/1981 | Ito et al. | 324/207.25 X |
| 4,458,322 | 7/1984 | Veale | 364/571 |
| 4,462,083 | 7/1984 | Schwefel | 364/577 |
| 4,490,674 | 12/1984 | Ito | 324/207.25 |
| 4,629,982 | 12/1986 | Kieslich . | |
| 4,791,366 | 12/1988 | Suzuki et al. | 324/252 |

FOREIGN PATENT DOCUMENTS

| | | |
|---|---|---|
| 0042917 | 4/1981 | European Pat. Off. . |
| 0478394 | 4/1992 | European Pat. Off. . |

OTHER PUBLICATIONS

Patent Abstracts of Japan, vol. 15, No. 351.

*Primary Examiner*—Gerard R. Strecker
*Attorney, Agent, or Firm*—Ronald P. Kananen

[57] ABSTRACT

A position detecting method for detecting a position of a moving object such as a bearing or a lens by capturing a plurality of repetitive periodic waveforms coming from a position sensor and performing data processing on the captured waveforms. The method comprises the steps of moving the moving object by more than one period of the waveforms, obtaining a maximum value and a minimum value of the waveforms, obtaining an offset value and a gain of the waveforms based on the maximum value and the minimum value, correcting a gain and an offset value of data based on the obtained offset value and the gain of the waveforms to create corrected data, and processing the corrected data to detect the position of the moving object.

6 Claims, 7 Drawing Sheets

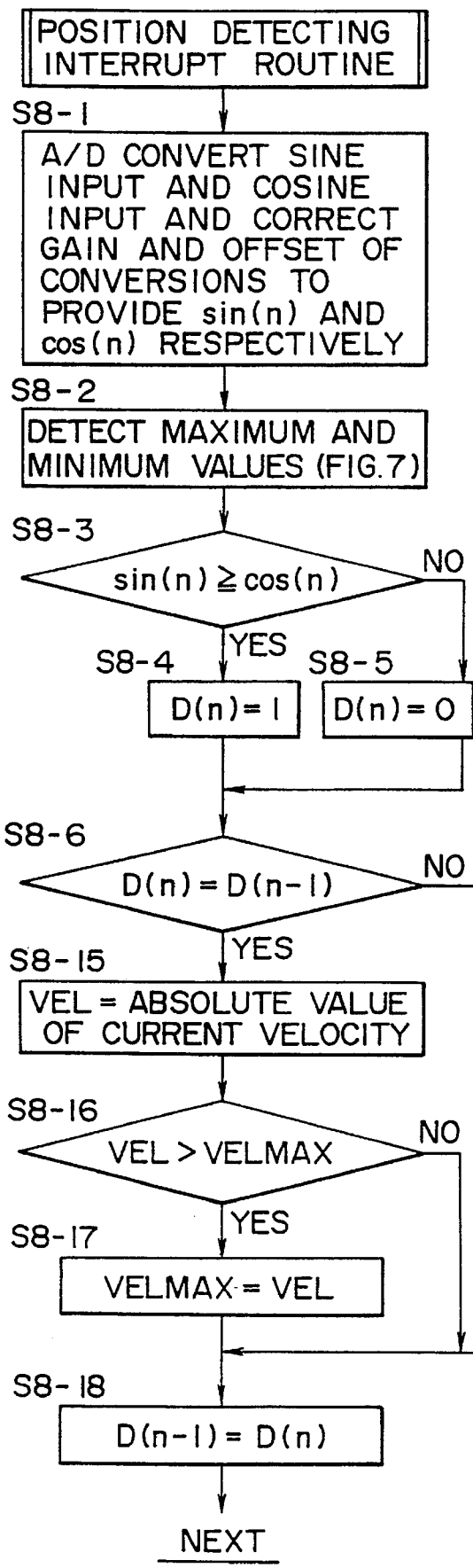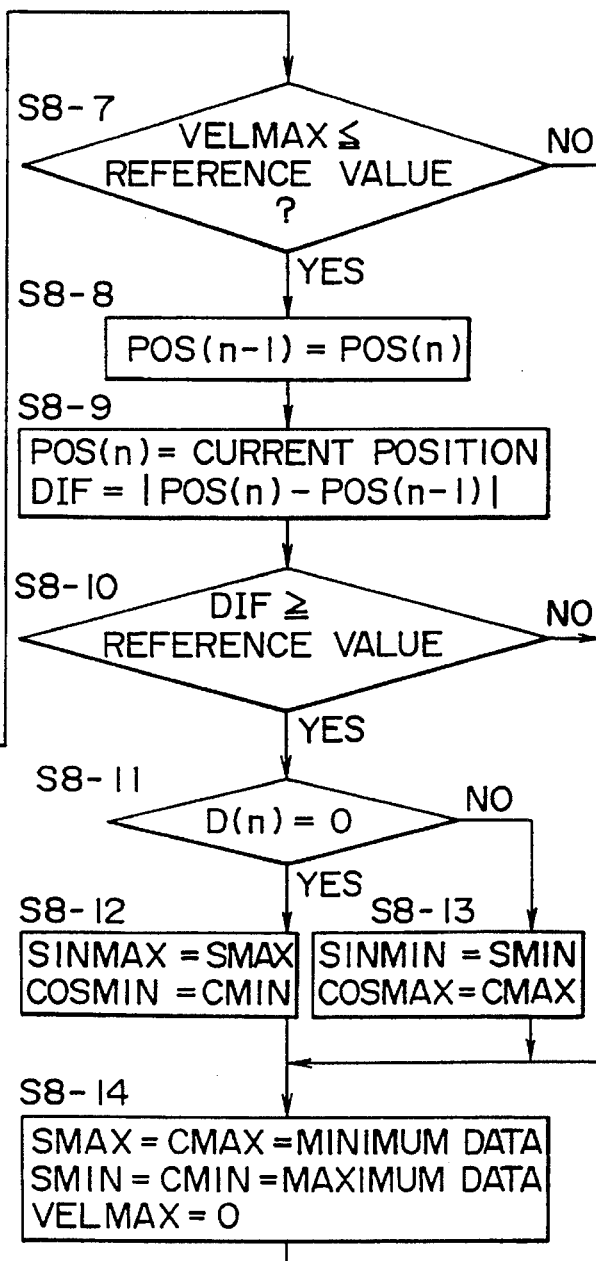
FIG. 8

POSITION DETECTING METHOD FOR USE IN OPTICAL SYSTEM OF A VIDEO CAMERA FOR CORRECTING GAIN AND OFFSET FOR PERIODIC WAVEFORMS

BACKGROUND OF THE INVENTION

Field of the Invention

The present invention relates to a position detecting method suitably applicable to focusing of an optical lens system, for example.

Description of the Prior Art

It is known that, in a position sensor adapted to detect a position of a moving object by sampling a repetitive periodic waveform generated by the sensor, a signal to be entered in an A/D converter is adjusted in gain and offset by an analog adjusting circuit provided outside the position sensor so that the signal is entered in the converter in an ideal state.

The above-mentioned method, however, requires an externally attached analog adjusting circuit, which in turn requires an adjustment of a constant of the circuit at an initial adjustment of the circuit. Instead of making the adjustment by means of the externally attached analog adjusting circuit, data such as gain data and offset values may be stored in an external storage device to use them as fixed data for the adjustment. However, this method requires an adjustment for obtaining the fixed data. Further, since both of the above-mentioned methods have fixed gains and offset values, it is impossible for the methods to cope with a temperature variation or a drift of a sensor in a usual operation. The temperature variation or the drift degrades a detection accuracy of the position sensor.

OBJECTS AND SUMMARY OF THE INVENTION

It is therefore an object of the present invention to provide a position detecting method for obtaining a position of a moving object with an accuracy higher than that of the prior art.

In carrying out the invention and according to one aspect thereof, there is provided a position detecting method for obtaining a position of a moving object by capturing a plurality of repetitive periodic waveforms coming from a position sensor and performing data processing on the waveforms, comprising the steps of moving the moving object by more than one period of each of the waveforms, detecting a maximum value and a minimum value of each of the waveforms, obtaining an offset value and a gain based on the detected maximum value and the minimum value, correcting the offset value and the gain so that the offset values of each waveform match each other and the gains of each waveform match each other to obtain corrected values, correcting each of the waveforms based on the corrected values, and detecting the position of the moving object based on the corrected waveforms.

Preferably, an offset and a gain of each repetitive periodic waveform are obtained for each period of the waveform to correct the offset value and the gain real-time.

Preferably, when a velocity of the moving object has exceeded a predetermined value, detection of the maximum value and the minimum value is stopped and the waveforms are corrected based on an offset value and a gain obtained before the detection is stopped. Preferably, the maximum value and the minimum value are obtained between intersecting points of the waveforms. Preferably, the waveforms are each a sine wave and a cosine wave each. Preferably, the waveforms are three-phase sine waves having a phase difference of 120 degrees between them.

Also, the position detecting method is preferably applied to a position detecting system of an optical system of a video camera.

The novel setup eliminates use of the external analog adjusting circuit as well as its adjusting process. Further, since the invention requires no external storage device, a temperature variation and a drift in sensor outputs can be corrected to ensure position sensing of high precision.

BRIEF DESCRIPTION OF THE DRAWINGS

The above and other objects, features and advantages of the present invention will become more apparent from the following description taken in connection with the accompanying drawings, in which:

FIG. 8 is a flowchart describing a sequence for correcting real-time gain and an offset value of the corrected data.

DESCRIPTION OF THE PREFERRED EMBODIMENT

This invention will be described in further detail by way of a preferred embodiment thereof with reference to the accompanying drawings.

Figure 1:
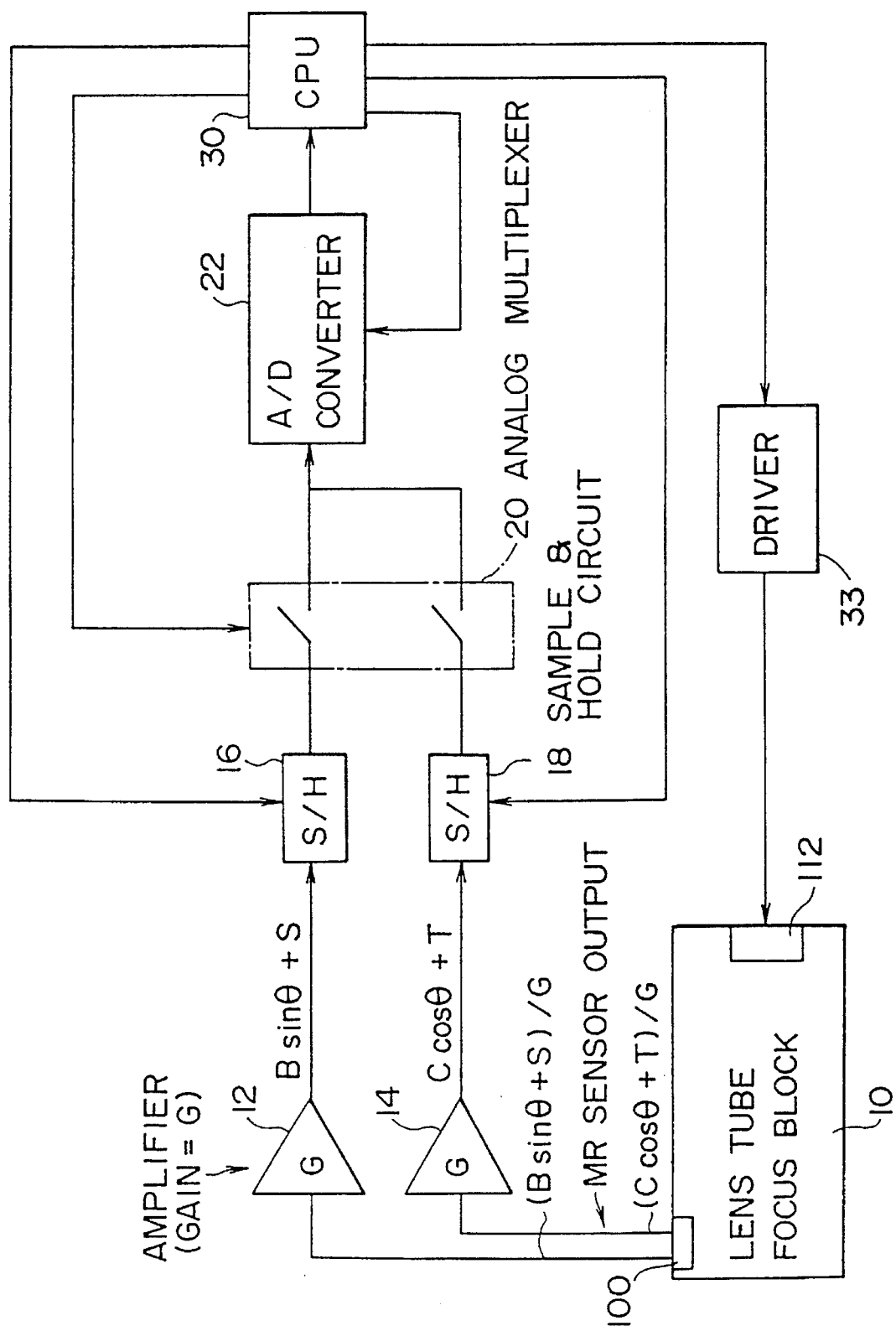
FIG. 1 is block diagram illustrating a constitution of a magnetoresistance effect type position sensor (hereinafter referred to as an MR sensor) practiced as a preferred embodiment of the present invention as applied to a zoom lens system.
Figure 2:
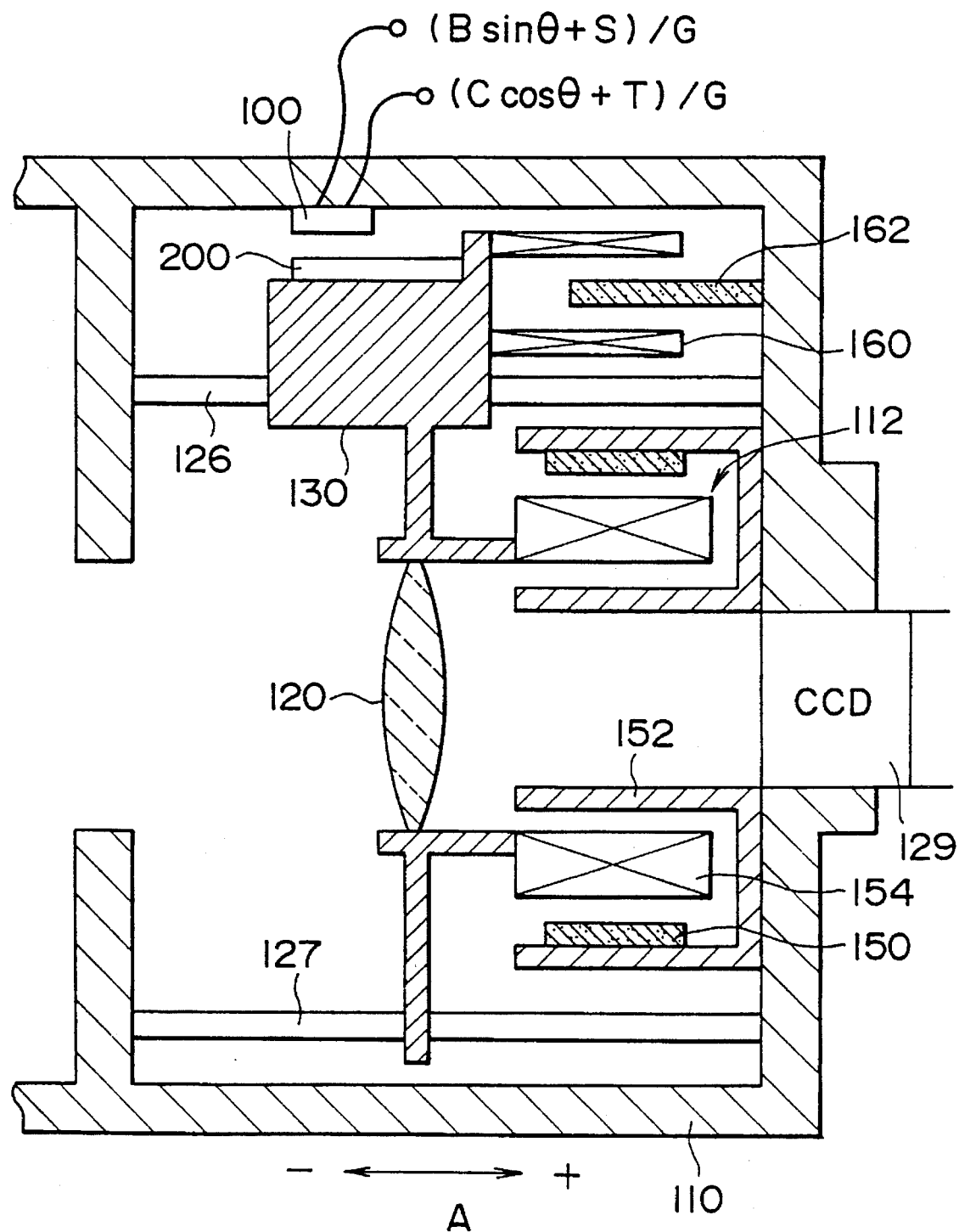
FIG. 2 is a sectional diagram illustrating a focus block of a zoom lens mechanism of the zoom lens system of FIG. 1 and the MR sensor installed in the focus block.

Referring now to the drawings, wherein like reference characters designate like or corresponding parts throughout the several views, FIG. 1 illustrates a constitution of an MR sensor practiced as the preferred embodiment of the invention as applied to a zoom lens system while FIG. 2 illustrates the MR sensor as applied to an optical system of a video camera.

In FIG. 1, a lens tube 10 has a focus adjusting block to be described. An MR sensor 100 provided in the lens tube 10 is connected to two amplifiers 12 and 14. The gains of each of these amplifiers is G. The amplifiers 12 and 14 are connected to sample-and-hold (S/H) circuits 16 and 18 respectively. Ideally, the MR sensor generates two repetitive periodic waveform signals $A\sin\theta$ and $A\cos\theta$. Actually, however, the output of the MR sensor contains a discrepancy between the waveform signals in offset value and gain. Therefore, the MR sensor generates two repetitive waveform signals containing the offset value and the gain each; that is, $(B\sin\theta+S)/G$ and $(C\cos\theta+T)/G$. The signals $(B\sin\theta+S)/G$ and $(C\cos\theta+T)/G$ are fed to the amplifiers 12 and 14 respectively to be fed to the sample-and-hold circuits 16 and 18 respectively as $B\sin\theta +S$ and $C\cos\theta+T$.

The sample-and-hold circuits 16 and 18 are connected to an A/D converter 22 via an analog multiplexer 20. The A/D converter 22 is connected to a CPU 30.

The CPU 30 is connected to the sample-and-hold circuits 16 and 18 and the analog multiplexer 20 to give an instruction signal to each of them. The CPU 30 is also connected to a driver 33 and instructs the driver 33 to control a direct drive linear motor 112 of the focus adjusting block in the lens tube 10.

Referring to FIG. 2, the MR sensor 100 is used in the focus adjusting block as a position detecting device, which is of a sampling type. The lens tube 110, or the casing of this optical lens system, contains the linear motor 112, a lens 120, a reference axis 126, a sub guide 127, a bearing 130, the MR sensor 100, and a CCD 129.

The MR sensor 100 is disposed in opposition to a magnet 200. The MR sensor is fixedly secured on an inner surface of the casing 110. The magnet is fixedly secured on the bearing 130. The MR sensor 100 is adapted to generate the above-mentioned two repetitive periodic waveform signals $(B\sin\theta+S)/G$ and $(C\cos\theta+T)/G$ at each pitch $\lambda$ of the magnet 200.

The linear motor 112 is a direct drive linear motor of voice coil type. The linear motor 112 has a magnet 150, a yoke 152, and a drive coil 154. When this linear motor 112 operates, the bearing 130 and the magnet 200 move in a direction of an arrow A together with the lens 120.

On the bearing 130, a damping coil 160 is fixedly secured. On the casing 110, a damping magnet 162 is fixedly secured. The damping coil 160 and the damping magnet 162 constitute braking means of the linear motor.

Figure 3:
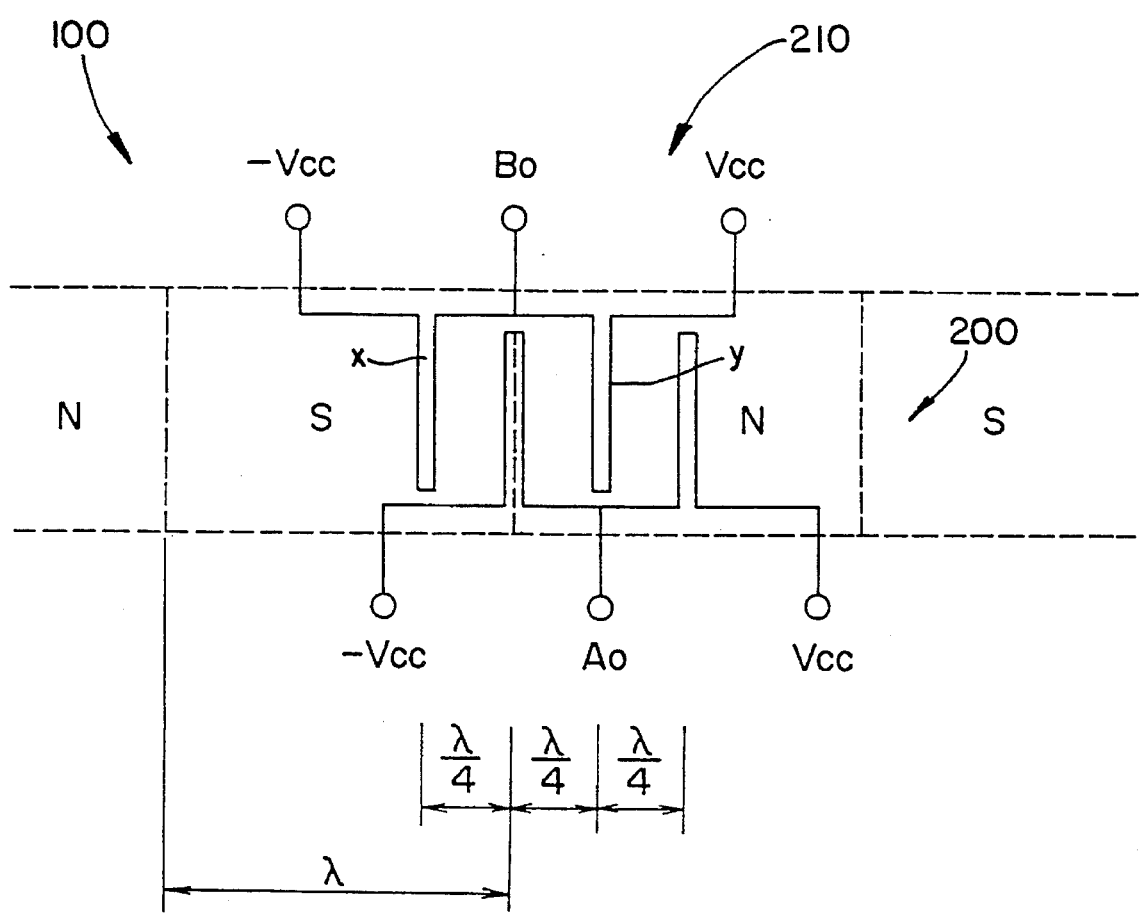
FIG. 3 is a diagram illustrating a magnetoresistance element pattern and a linear attracting magnet for producing, for example, sin and cos output patterns for the MR sensor of FIG. 2.

FIG. 3 shows principles of operation of the MR sensor. An MR pattern 210 is disposed in opposition to the magnet 200. The magnet 200 is linearly attracted at a period 2 of several hundred μm for example. The MR pattern 210 consists of magnetoresistance element patterns x and y spaced by $\lambda/2$. The magnetoresistance element patterns x and y are connected in series between DC supplies Vcc and −Vcc. As shown in FIG. 2, when the magnet 200 moves along with movement of the bearing 130 and the lens 120 whose position is to be measured, the MR pattern 210 generates a repetitive periodic waveform varying in a sine wave around ground GND according to the movement of the magnet 200.

If two of the above-mentioned MR patterns 210 are disposed with an offset of $\lambda/4$, output signals $(B\sin\theta+S)/G$ and $(C\cos\theta+T)/G$ obtained by including an offset value and a gain contained in signals $A\sin\theta$ and $A\cos\theta$ having period $\lambda$ and amplitude A each are generated as the bearing 130 moves.

Figure 4:
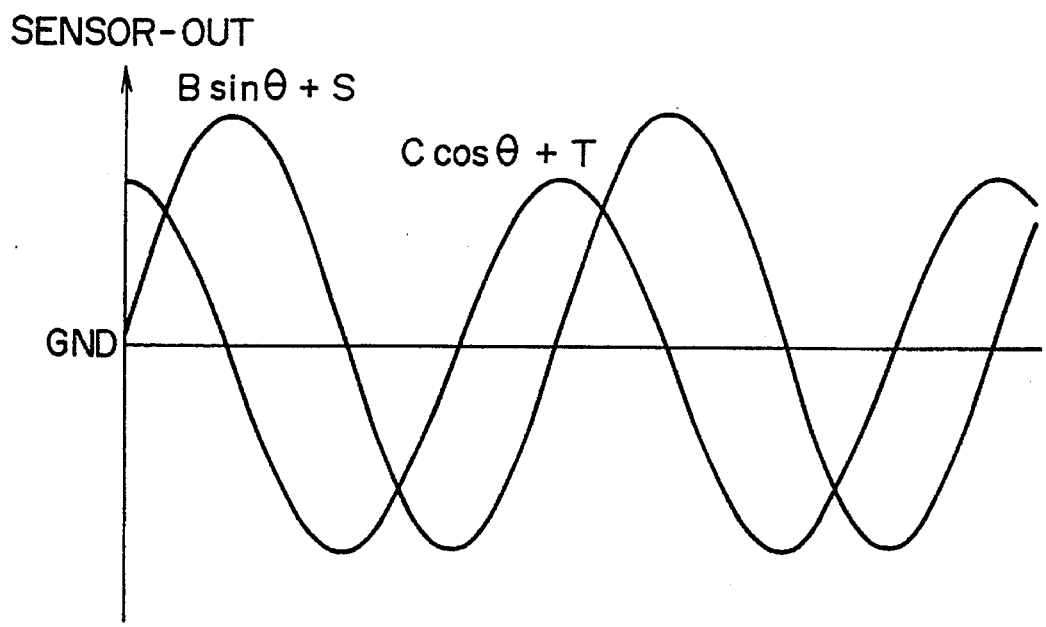
FIG. 4 is a diagram illustrating an example of an output signal of the MR sensor of FIG. 2 obtained immediately after the amplifiers of FIG. 1.
Figure 5:
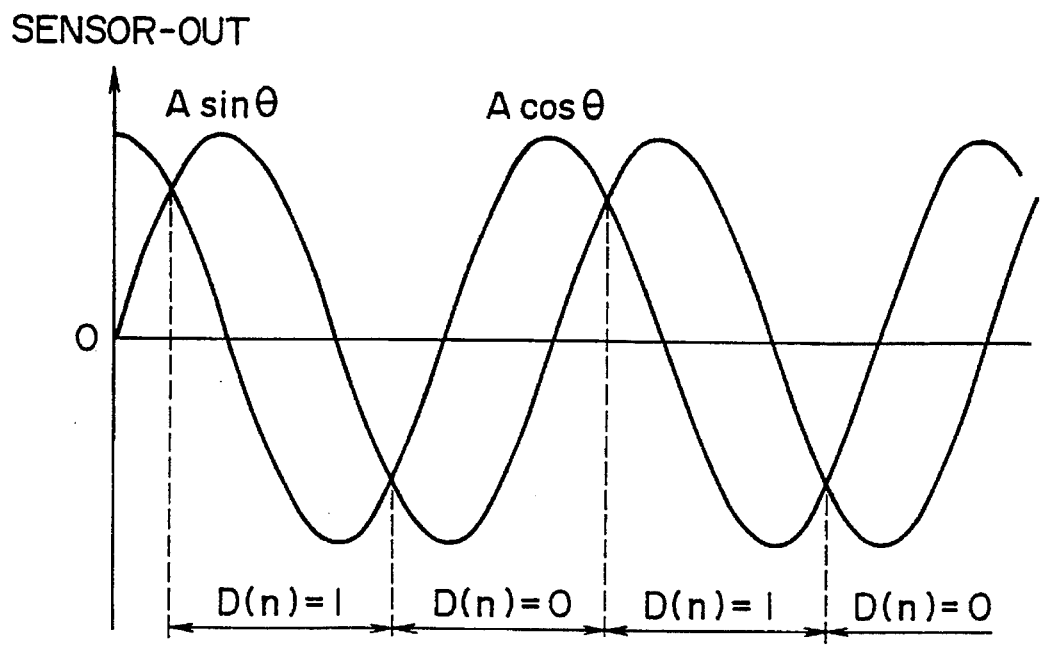
FIG. 5 is a diagram illustrating an example of an output signal of the MR sensor of FIG. 2 with its gain and offset value corrected.

FIG. 4 shows an example of output signals of the amplifiers 12 and 14 having gain G of FIG. 1. As shown in FIG. 4, there is a discrepancy between the output signals in the gain and the offset value of the MR sensor 100, so that these two repetitive periodic waveforms cannot be used as positional information because of a lack of accuracy. Consequently, the gain and the offset value are corrected as will be described and repetitive periodic waveforms based on the corrected gain and offset value shown in FIG. 5 are used for position sensing.

Figure 6:
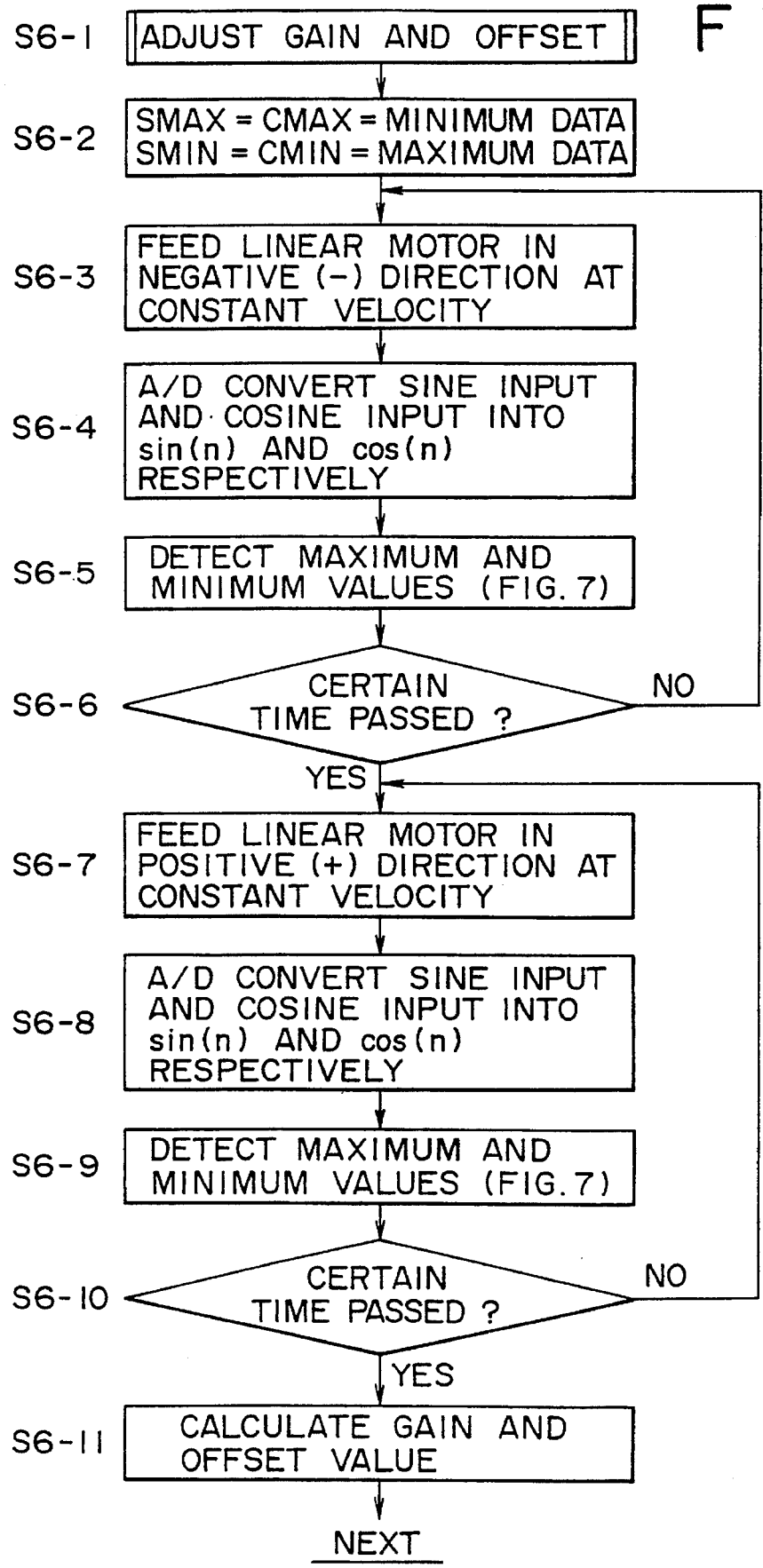
FIG. 6 is a flowchart describing a sequence for adjusting the gain and offset value.

FIG. 6 shows an example of a sequence of adjusting the gain and the offset value at powering on or resetting the zoom lens system.

First, in steps S6-1 and S6-2, a minimum value of a dynamic range of data is entered in maximum value registers SMAX and CMAX as a default (initial) value and a maximum value of the dynamic range of the data is entered in minimum value registers SMIN and CMIN as a default (initial) value. It should be noted that the initial values are not specifically limited; they may be any points on the repetitive periodic waveforms.

Next, the CPU 30 issues a negative (−) direction constant velocity feed command signal to the driver 33 of FIG. 1 as shown in step S6-3 of FIG. 6. The object to be measured, that is, the bearing 130 and the lens 120, is driven by more than one period of the repetitive periodic waveform. Consequently, as shown in step S6-4, the output signals $(B\sin\theta+S)/G$ and $(C\cos\theta+T)/G$ of the MR sensor 100 are fed to the amplifiers 12 and 14 and to the sample and hold circuits 16 and 18 respectively and then to the analog multiplexer 20 and the A/D converter 22 to be converted into signal data $\sin(n)$ and $\cos(n)$ respectively.

Figure 7:
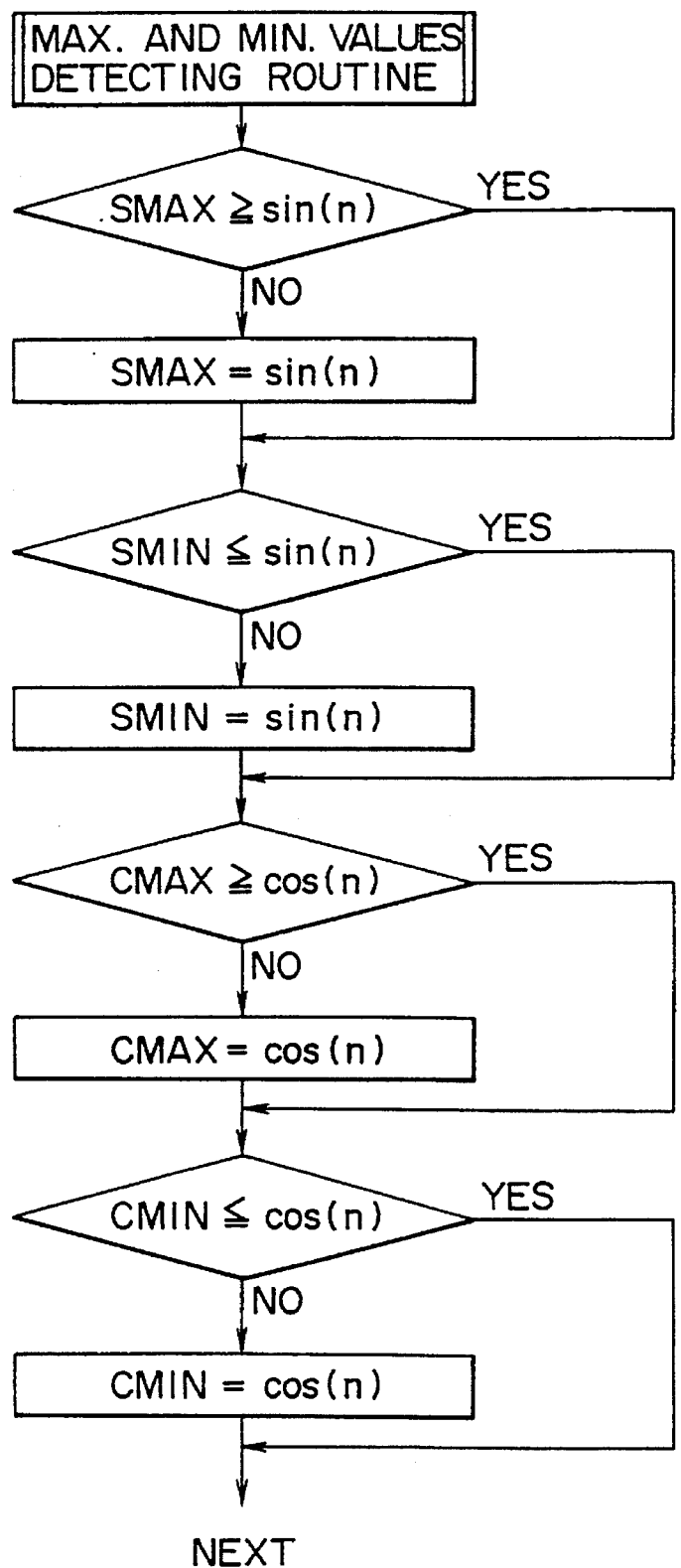
FIG. 7 is a flowchart describing a sequence for detecting a maximum value and a minimum value of corrected data.

The CPU 30 detects a maximum value and a minimum value of each of above-mentioned $\sin(n)$ and $\cos(n)$ according to a sequence shown in FIG. 7. That is, the CPU 30 determines whether the SMAX is greater than the $\sin(n)$; if it is found greater than the $\sin(n)$, then the CPU determines whether the $\sin(n)$ is greater than the SMIN. If, however, the SMAX is found smaller than the $\sin(n)$, the SMAX is regarded as being equal to the $\sin(n)$.

If the $\sin(n)$ is found greater than the SMIN, the CPU determines whether the CMAX is greater than the $\cos(n)$. If the $\sin(n)$ is found smaller than the SMIN, the $\sin(n)$ is regarded as being equal to the SMIN.

If the CMAX is found greater than the $\cos(n)$, the CPU determines whether the $\cos(n)$ is greater than the CMIN. If, however, the $\cos(n)$ is found greater than the CMAX, the $\cos(n)$ is regarded as being equal to the CMAX and the CPU determines whether the $\cos(n)$ is greater than the CMIN.

If the $\cos(n)$ is found greater than the CMIN, the processing goes to step S6-6 of FIG. 6. If, however, the $\cos(n)$ is found smaller than the CMIN, the CMIN is regarded as being equal to the $\cos(n)$ and the processing goes to step S6-6.

Thus, the CPU 30 repeats steps S6-3 through S6-6 for a certain period of time or by a certain number of times to obtain maximum and minimum values of the periodic waveforms $\sin(n)$ and $\cos(n)$ captured at a negative-direction feed.

Then, as shown in steps S6-7 through S6-10 of FIG. 6, the CPU 30 issues a positive (+) direction constant velocity command signal to the driver 33 as shown in step S6-7 of FIG. 6, as with steps S6-3 through S6-6. The object to be measured, that is, the bearing 130 and the lens 120, is driven by more than one period of the repetitive periodic waveform.

As the bearing 130 moves, the MR sensor 100 generates $(B\sin\theta+S)/G$ and $(C\cos\theta+T)/G$. As shown in step S6-8, the output signals $(B\sin\theta+S)/G$ and $(C\cos\theta+T)/G$ of the MR sensor are fed to the amplifiers 12 and 14 respectively and to the sample and hold circuits 16 and 18 respectively and then to the analog multiplexer 20 and to the A/D converter to be converted into $\sin(n)$ and $\cos(n)$ respectively.

The CPU repeats these steps S6-7 through S6-10 for a certain period of time or by a certain number of times to obtain maximum and minimum values of the periodic waveforms sin(n) and cos(n) captured at a positive-direction feed.

Now, the maximum value (SMAX) of the sine input after the end of the above-mentioned sequence of FIG. 6 will be SINMAX while the maximum value (CMAX) of the cosine input will be COSMAX. The minimum value (SMIN) of the sine input will be SINMIN while the minimum value (CMIN) of the cosine input will be COSMIN. A gain and an offset value of each sine input and each cosine input will be as follows.

The offset value SOFF of the sine input is given by equation (1). The offset value COFF of the cosine input is given by equation (2). The gain SGAIN of the sine input is given by equation (3). The gain CGAIN of the cosine input is given by equation (4). D range in equations (3) and (4) each indicates a dynamic range of data. It should be noted that, in this embodiment, the CPU 30 obtains the gains of the sine and cosine inputs as increments with an amplitude of each repetitive periodic waveform being the dynamic range; however, this amplitude may be any value as long as it is common to both the repetitive periodic waveforms.

$$SOFF=(SINMAX+SINMIN)/2 \quad (1)$$

$$COFF=(COSMAX+COSMIN)/2 \quad (2)$$

$$SGAIN = D\ range\ of\ data/(SINMAX-SINMIN) \quad (3)$$

$$CGAIN = D\ range\ of\ data/(COSMAX-COSMIN) \quad (4)$$

The CPU 30 calculates the gains and the offset values from equations (1) through (4) and corrects the obtained gains and offset values of the sine and cosine inputs by equations (5) and (6) respectively:

$$[sin(n)-SOFF]*SGAIN \quad (5)$$

$$[cos(n)-COFF]*CGAIN \quad (6)$$

The data correction is realized by the equations (5) and (6); that is, the corrected repetitive periodic waveforms are obtained as corrected data. Referring to FIG. 5, repetitive periodic waveforms $Asin\theta$ and $Acos$ are the corrected data of the MR sensor. As shown in FIG. 5, after the correction, the data signals have the corrected offset value and the corrected gain each, so that they provide a sine signal and a cosine signal which match each other and fully deflect across the D range around data 0. Performing data processing on these sine and cosine signals realizes a precision position sensing system.

Now, referring to FIG. 8, this is a sequence of correcting real-time the gain and the offset value during a zoom operation of the zoom lens system.

First, processing indicated by steps S8-1 and S8-2 of FIG. 8 is performed like steps S6-1 through S6-5 of FIG. 6. That is, the CPU 30 corrects the input repetitive periodic waveforms based on the current offset values and gains by using equations (5) and (6) to obtain sin(n) and cos(n).

The CPU 30 then performs the sequence of FIG. 7 on the sin(n) and the cos(n) to update the maximum value registers for the SMAX and CMAX inputs and the minimum value registers for the SMIN and CMIN inputs.

In steps S8-2 and S8-3 of FIG. 8, the CPU 30 compares the sin(n) with the cos(n). If the sine input is found greater than the cosine input, variable D(n) is set to 1; otherwise, it is set to 0 (refer to steps S8-4 and S8-5). A magnitude relationship of the variable D(n) with the sine and cosine inputs is as shown in FIG. 5.

In step S8-6, the CPU 30 compares the current variable D(n) with a value D (n−1) of a variable D(n) obtained at a previous sampling to check the magnitude relationship between inputs for any change during sampling.

If a change is found in the magnitude relationship, the CPU 30 executes step S8-7. In the step S8-7, the CPU 30 determines whether a maximum velocity VELMAX of the object under measurement until the D(n) has changed is higher than a reference value. As a velocity of the object under measurement increases, the input waveforms are sampled more coarsely, reducing an accuracy of measured data. To prevent the accuracy from lowering, the CPU 30 performs the comparison in step S8-7. If the velocity is found greater than the reference value, the CPU 30 executes step S8-14, which is a routine for initializing the maximum value registers and the minimum value registers.

Thus, the maximum and minimum values are updated. When the velocity has exceeded the reference value, the CPU 30 stops updating the maximum and minimum values in the correction sequence to prevent the data accuracy from dropping due to coarse sampling, reproducing more accurate gains and offset values.

In steps S8-8 and S8-9, the CPU 30 obtains an absolute value of a positional difference between point POS(n−1) at which a change in the magnitude took place previously and point POS(n) at which a change in the magnitude has taken place this time(the current position). The absolute value is expressed in DIF. In step S8-10, the CPU 30 compares the absolute value DIF with the reference value to determine whether the change has been caused by passing a same intersecting point or a next intersecting point after a peak. The reference value is approximately between $\lambda/2$ and $\lambda/4$ inclusive.

If the change has taken place when passing the same point, it is not certain whether the peak has been detected or not, so that the processing jumps to step S8-14, the routine for initializing the maximum and minimum value registers. If the DIF is found higher than the reference value, it indicates that the peaks (the maximum and minimum values) of the input waveform have been detected, causing the processing to go to step S8-11 to update the maximum and minimum values.

In step S8-11, the CPU 30 determines the D(n) value. As seen from FIG. 5, when the D(n) has changed from 1 to 0, the maximum value of the sine input and the minimum value of the cosine input are detected during the change, resulting in an update of the SINMAX and the COSMIN (in step S8-12).

When the D(n) has changed from 0 to 1, the minimum value of the sine input and the maximum value of the cosine input are detected, updating the SINMIN and the COSMAX (in step S8-13).

In step S8-14, the maximum value and minimum value registers are initialized for detecting the next peak. The maximum value of the dynamic range of data is entered in the maximum value registers SMAX and CMAX, while the minimum value of the dynamic range is entered in the minimum value registers SMIN and CMIN. Data 0 is entered in a maximum velocity register VELMAX.

In steps S8-15 through S8-17, the CPU 30 obtains the maximum value of the absolute value of the velocity until the D(n) changes. Lastly, when the CPU 30 determines that the D(n−1)is equal to the D(n) in step S8-18, this interrupt routine terminates.

Thus, in the above-mentioned sequence, a range is provided at each intersecting point between the corrected input data at detecting the maximum and minimum values of the data and the maximum and minimum values of the range are obtained to realize the detection of the peaks of the input periodic waveforms very easily.

Using the above-mentioned sequence can correct a characteristic error of the offset voltage and the gain in the sensor output caused by a temperature variation or the like, realizing a highly accurate position sensing system that is impossible with the prior art.

Applying the above-mentioned position detecting method to a position detecting system of an optical system of a video camera for example eliminates use of a conventional gain and offset adjusting circuit, reducing size, weight, and price of the system as well as enhancing its focusing capability owing to the increased positional accuracy.

It should be noted that, in the abovementioned embodiment, the position detecting operation can be performed at the time the system is set up or reset.

While the preferred embodiment of the invention has been described using specific terms, such description is for illustrative purpose only, and it is to be understood that changes and variations may be made without departing from the spirit or scope of the appended claims.

What is claimed is:

1. A position detecting method for detecting a position of a moving object by sensing a plurality of repetitive periodic waveforms provided from a position sensor and related to said moving object relative to a reference position, and performing data processing on said plurality of repetitive periodic waveforms to provide corrected repetitive periodic waveforms having corrected gain and offset values, comprising the steps of:

moving said moving object by a distance to produce more than one period of said plurality of repetitive periodic waveforms;

detecting a maximum value and a minimum value of each of said plurality of repetitive periodic waveforms;

obtaining, based on the detected maximum value and the minimum value, an offset value and a gain of each of said plurality of repetitive periodic waveforms;

correcting the offset values and the gains of said plurality of repetitive periodic waveforms so that the offset values match each other and the gains match each other;

correcting each of said plurality of repetitive periodic waveforms based on the corrected offset values and gains to provide corrected repetitive periodic waveforms representing corrected data representative of movement of said moving object; and detecting the position of the moving object based on the corrected repetitive periodic waveforms;

wherein, when a velocity of the moving object has exceeded a predetermined value, detection of said maximum value and said minimum value is stopped and said plurality of repetitive periodic waveforms are corrected based on an offset value and a gain obtained before the detection is stopped.

2. A position detecting method as defined in claim 1, wherein the offset value and the gain of each of said plurality of repetitive periodic waveforms are obtained for each period thereof to correct the offset value and the gain real-time.

3. A position detecting method as defined in claim 1, wherein said maximum value and said minimum value are Obtained between intersecting points of said plurality of repetitive periodic waveforms.

4. A position detecting method as defined in claim 1, wherein said plurality of repetitive periodic waveforms are a sine wave and a cosine wave each.

5. A position detecting method as defined in claim 1, wherein said plurality of repetitive periodic waveforms are three-phase sine waves having a phase difference of 120 degrees between them.

6. A position detecting method as defined in claim 1, which is applied to a position detecting system of an optical system of a video camera.

* * * * *